United States Patent [19]

Spees

[11] Patent Number: 4,474,632
[45] Date of Patent: Oct. 2, 1984

[54] METHOD OF FORMING A COMPOSITE FOAM INSULATED JACKET FOR A RAILROAD TANK CAR

[76] Inventor: Charles L. Spees, P.O. Box 164, Elkhorn, Wis. 53121

[21] Appl. No.: 305,979

[22] Filed: Sep. 28, 1981

Related U.S. Application Data

[63] Continuation of Ser. No. 36,364, May 7, 1979, abandoned.

[51] Int. Cl.³ .............................................. B29D 27/04
[52] U.S. Cl. .................................. 156/78; 156/331.7; 264/46.4; 264/46.9; 427/244; 427/247; 427/258; 427/409
[58] Field of Search ........................... 264/46.4, 46.9; 427/244, 247, 258, 409, 421; 156/78, 331.7

[56] References Cited

U.S. PATENT DOCUMENTS

| | | | |
|---|---|---|---|
| 951,239 | 3/1910 | Garrett | 105/360 |
| 1,614,107 | 1/1927 | Cleary | 165/169 |
| 2,266,134 | 12/1941 | Wachowitz . | |
| 2,766,705 | 10/1956 | Flowers | 105/451 |
| 2,863,797 | 12/1958 | Meyer | 264/321 X |
| 3,091,551 | 5/1963 | Robertson | 427/247 X |
| 3,158,383 | 11/1964 | Anderson | 280/5 C |
| 3,176,764 | 4/1965 | Barbera | 165/168 |
| 3,253,731 | 5/1966 | Fink et al. | 264/46.9 X |
| 3,338,185 | 8/1967 | Phillips | 105/358 |
| 3,429,085 | 2/1969 | Stillman, Jr. | 264/46.4 X |
| 3,455,483 | 7/1969 | Tuklaar | 220/71 |
| 3,547,047 | 12/1970 | Needham | 105/360 X |
| 3,599,575 | 8/1971 | Yurkoski | 105/358 |
| 3,707,434 | 12/1972 | Stayner | 427/421 X |
| 3,753,848 | 8/1973 | Bennett | 427/409 X |
| 3,876,739 | 4/1975 | Loveland | 264/46.4 |
| 3,879,240 | 4/1975 | Wall | 427/421 X |
| 4,004,706 | 1/1977 | Guldenfels et al. | 220/3 |
| 4,032,608 | 6/1977 | Zinniger et al. | 264/46.6 |
| 4,044,690 | 8/1977 | Deeks | 105/247 |
| 4,075,264 | 2/1978 | Hay | 264/46.9 X |
| 4,113,901 | 9/1978 | Collins | 427/421 X |
| 4,333,973 | 6/1982 | Bellafiore et al. | 427/421 X |

FOREIGN PATENT DOCUMENTS 2105376  10/1972  Fed. Rep. of Germany ...... 427/247

OTHER PUBLICATIONS

Chase Chemical Corp. Booklet: "Urethane Foam Components, Foam Equipment, Technical Service," Pittsburgh, Pa., Chase Chemical Corp., (1963), pp. 1-7; Covers and Introduction.

*Primary Examiner*—Philip E. Anderson
*Attorney, Agent, or Firm*—Willian Brinks Olds Hofer Gilson & Lione Ltd.

[57] ABSTRACT

A railroad tank car includes a tank body and means for applying generally uniform heat to the lower portion of the body. There are a plurality of spaced generally semicircular rings attached to the body with each pair of adjacent rings defining a heat chamber which extends laterally about the lower portion of the tank body. There are longitudinal channels having ports which open into each of the heat chambers. There is a cover for the tank which includes a longitudinally extending generally semicircular metal jacket. A layer of insulation is positioned about the jacket and a layer of plastic foam overlies and adheres to the insulation. The structure is completed by a plastic exterior coat, preferably fiberglass, which overlies and adheres to the plastic foam.

14 Claims, 5 Drawing Figures

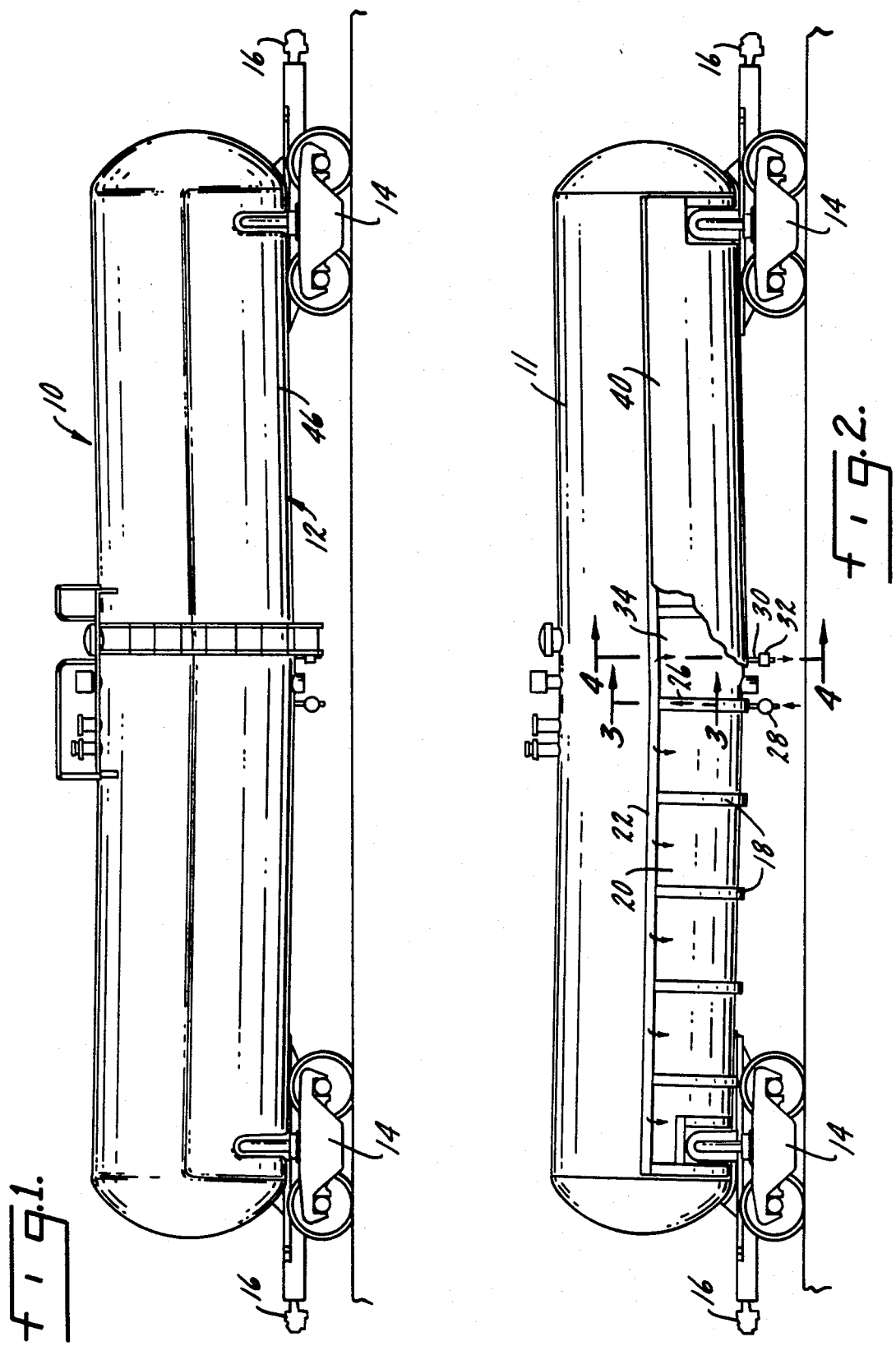

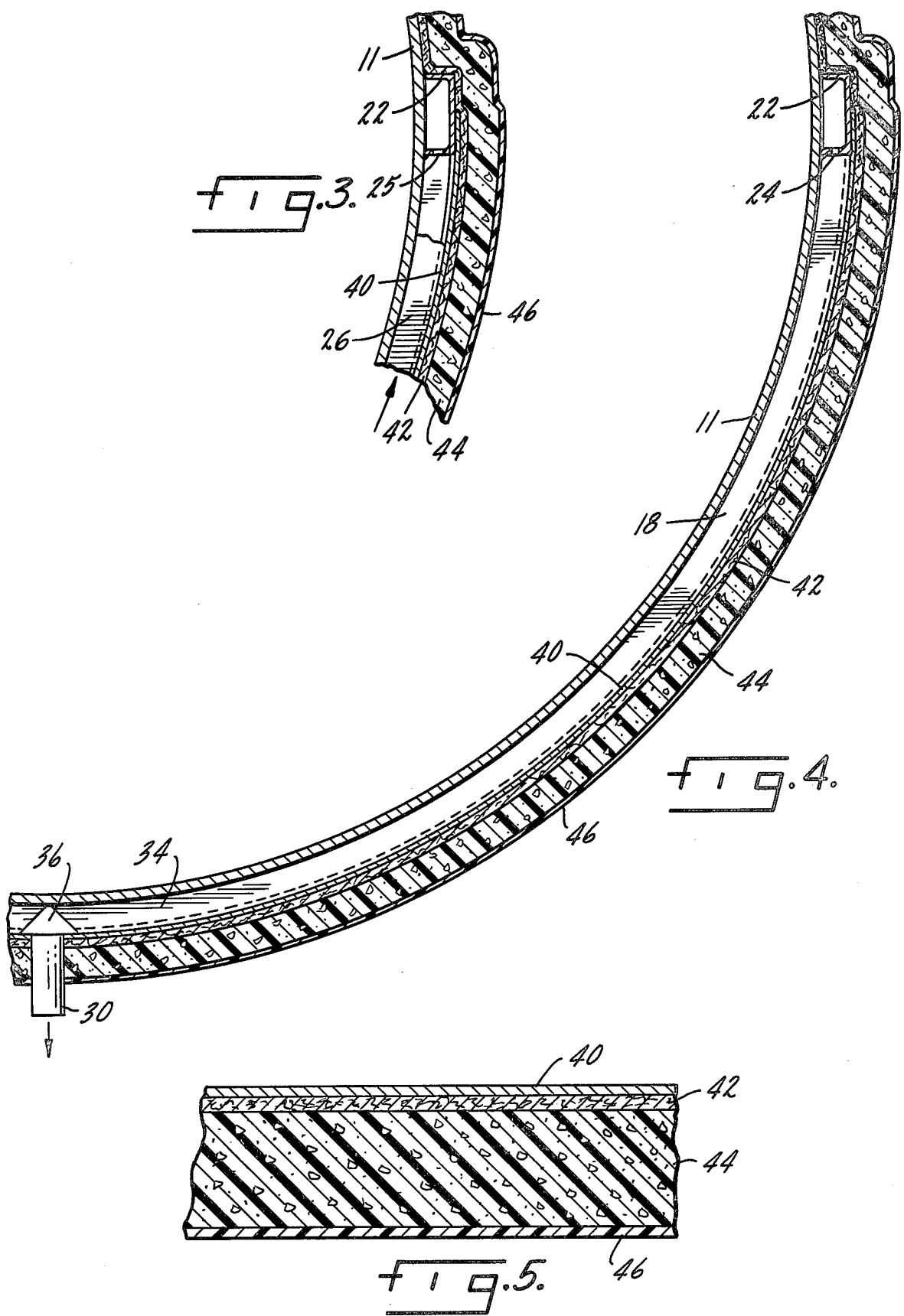

METHOD OF FORMING A COMPOSITE FOAM INSULATED JACKET FOR A RAILROAD TANK CAR

This is a continuation of application Ser. No. 036,364, filed May 7, 1979 now abandoned.

SUMMARY OF THE INVENTION

The present invention relates to railroad tank cars and in particular to a combination insulation and cover which encloses the tank and heater.

Another purpose is a tank car having a simply constructed reliable one-piece exterior coat.

Another purpose is a method of applying a one-piece laminated jacket to a railroad tank car which uses the tank body as a mold.

Another purpose is a laminated jacket for a railroad tank car body which provides built-in expansion control and is air tight.

Another purpose is an improved jacket for a railroad tank car body which eliminates the heretofore used sliding anchors.

Another purpose is a jacket formed of sprayed-on laminations for use on a railroad tank car body.

Another purpose is a jacket construction for a railroad tank car body which eliminates the requirement for painting.

Another purpose is a laminated jacket for use on railroad tank car bodies having substantially less weight than heretofore used constructions.

Another purpose is a laminated jacket for use on railroad tank car bodies which provides considerable savings in manufacturing costs and maintenance over the life of the car.

In the disclosed embodiment the one-piece exterior jacket of this invention is used in a tank car which includes an annular heater, which heater can be applied to all types and sizes of tanks with no design modifications. The disclosed tank car heater provides more efficient and uniform heating over the entire heater area and it makes more efficient use of heating steam. The disclosed tank car heater provides a heating space at substantially less cost than previous designs and in addition, provides stiffening for the tank itself. The disclosed tank car heater provides uniform heat and uniform pressure to the heat chambers.

Other purposes will appear in the ensuing specification, drawings and claims.

BRIEF DESCRIPTION OF THE DRAWINGS

The invention is illustrated diagrammatically in the following drawings wherein:

FIG. 1 is a side view of a railroad tank car,

FIG. 2 is a side view, similar to FIG. 1, but with the insulated jacket removed and a portion of the steel heater cover removed, FIG. 3 is a partial section along plane 3—3 of FIG. 2, FIG. 4 is a partial section along plane 4—4 of FIG. 2, and FIG. 5 is a section through the insulated jacket.

DESCRIPTION OF THE PREFERRED EMBODIMENT

Railroad tank car exterior heaters presently in use generally consist of longitudinally extending half oval sections, six or eight inches wide, which cover the lower portion of the tank with spaces in between. The ends of the heaters are connected with the steam supply and return line so that steam is circulated through each half section, thereby transferring heat to the commodity within the tank. The areas between the half oval sections generally receive heat from a fin construction. The principal drawback with this type of construction is that it does not provide a uniform heat for the contents of the tank. In addition, each different design of tank, whether it be a straight shell, scalene cone, opposed frustoconic or plain sloping bottom, must have a different design for the half oval heaters and a different design to facilitate drainage of the condensate. The present invention overcomes the above disadvantages as will appear in more detail hereinafter.

In FIG. 1 a tank car indicated generally at 10 includes a tank 11 (see FIG. 2) which has a cover 12 over generally the lower portion thereof. The tank car 10 is mounted in the conventional manner upon trucks 14 and there are the usual couplers 16. The conventional ladder and inlet and outlet connections are fixed on the tank in the normal manner.

Looking at FIG. 2 the tank has positioned thereupon a series of generally uniformly spaced semicircular rings or channels 18 which may be termed stiffening rings and divide the lower half of the tank exterior into heat chambers 20, generally uniform in size. The rings, which are each formed by two generally equal sections, are positioned along generally the entire length of the tank and thus will divide the exterior lower portion of the tank into a series of annular heat chambers. There are two, although only one is shown herein, longitudinally extending channels 22 which are positioned upon the upper ends of the rings 18 and form the upper closures for each of the heat chambers 20. There is a port in each longitudinal channel 22 opening downwardly into each chamber 20. The ports are shown in detail in FIG. 4 at 24. Ports 24 are graduated in size with the smallest port being adjacent the center of the tank and the largest ports being adjacent the opposite ends of the tank. For example, the ports may vary in size from $\frac{3}{8}$ inch to $\frac{3}{4}$ inch, with such variation being uniform between the center and outer ends.

It is customary in the heating of tank cars to use steam as the heat medium although the invention should not be limited to this application. In the event steam is used, the center stiffening ring 26 forms the steam inlet and there is a pressure reducing valve 28 at the inlet so as to provide generally constant steam pressure within the heat chambers. The steam flows into ring 26 (FIG. 3) and then through an opening 25 into longitudinal channels 22 and then downwardly into each of the heat chambers 20 through the described ports.

Directly adjacent inlet ring 26 there is a condensate drain 30 which is illustrated particularly in FIG. 4. Drain 30, which may have a steam trap 32 associated therewith (FIG. 2) so as to drain only condensate, extends inwardly through the outer jacket to be described hereinafter and is in communication with interior space 34, illustrated in FIG. 4, which represents one of the steam or heat chambers. In order to connect the various heat chambers so that the condensate from all such chambers will drain through outlet 30, each of the stiffening rings 18 is formed in two sections defining a notch 36, which notches are at the bottom of each ring and are in longitudinal alignment so that the condensate from each of the heat chambers 20 will drain toward the center of the car.

Steam is applied to inlet ring 26 with pressure reducing valve 28 insuring that the pressure at the inlet is always a predetermined value, for example 53 psi, so as to provide a generally constant temperature within the various heat chambers. At a value of 53 psi inlet pressure the heat chamber temperature will be a generally constant 300° F. The steam flows into the longitudinal channels 22 and then through the variably sized ports 24 into each of the heat chambers 20. The condensate from the steam drains along the bottom of the various heat chambers through the spaced stiffening rings 18 to condensate outlet 30.

Because the steam is applied at uniform pressure and temperature to generally the entire bottom half of tank 10, the heat will be uniform. All parts of the tank bottom will be in contact with the steam chambers and thus there will be no intermittent heat as in the previously-described half oval type of system. By utilizing a pressure reducing valve and a steam trap, more efficient use of the steam is provided. In addition to defining the heat chambers it should also be understood that the stiffening rings 18 do provide a certain degree of support to the tank. Because the stiffening rings are positioned on the tank exterior in longitudinal spaced relation to each other, the same design may be utilized regardless of the shape and size of the tank. For example, a straight shell, scalene cone, opposed frustoconic or plain sloping bottom tanks all may utilize the same design with only the actual size of the rings being varied.

It is essential to maintain even pressure to secure the maximum and most efficient use of the steam in heating the contents of the tank. This result is provided by the pressure reducing valve situated at the heater inlet. A steam trap positioned at the heater outlet limits the discharge to condensate and there is no steam lost from the heat chambers.

Tank cars with heaters of necessity must have some form of insulation and the insulation is conventionally covered with a metal jacket so as to protect it from the weather. The jacket normally adds nothing to the strength of the car structure as it is free to move with the expansion and contraction of the tank during the heating cycle. Conventionally, sliding anchors are positioned at each end of the car and sliding sections are positioned at each body bolster to accomodate expansion and contraction. Such sliding sections are neither watertight nor airtight and so a degree of the protection for the insulation is lost.

The present invention provides a laminated jacket and insulation combined to form a one-piece cover for the car with built-in expansion control as well as providing an airtight cover. This is accomplished by using the tank as a mold over which the various layers to be described hereinafter are formed.

Looking at FIGS. 3, 4 and 5, the heater spaces 20 are covered by a steel jacket 40 which will be secured to the stiffening rings by welding or the like. The entire tank including jacket 40 forms the mold for the laminated cover. First, an absorbing insulation material, indicated at 42, is formed about the entire tank. This insulation may be sprayed on or applied in any suitable manner and it may be similar to the Pittsburgh Corning product known as TEMP-MAT made of glass fibers and put in mat form by a needling process. Other manufacturers make a similar insulation such as the Johns-Manville SPIN GLASS. The insulation will absorb tank expansion and will act as a heat barrier between the tank which will be heated to approximately 325° F. and second layer of insulation to be described which normally will accept heat only up to about 275° F.

Formed about the insulation layer 42 is a layer of foam, for example a urethane foam, of approximately 2 lb. density and preferably having a thickness of approximately two inches. The foam layer is indicated at 44 and again may be sprayed or otherwise formed upon insulating layer 42. Positioned about the urethane foam layer 44 is the final cover 46 which may be a polyester or epoxy reinforced fiberglass having a minimum tensile strength of approximately 38,000 psi. The fiberglass cover can be sprayed on so that the entire structure is a unitary one-piece outer cover or jacket for the entire tank. It is important that the materials, as sprayed or otherwise applied, adhere to the previously-deposited layer so as to form a unitary structure. Normally the various layers will be applied, one at a time, thus permitting one layer to cure before the succeeding material is applied to it.

By utilizing a fiberglass exterior, the resin may be mixed with a suitable color or pigment so that the desired coloring may be applied to the tank with elimination of painting which is conventionally a process which must be repeated as the car remains in service. In addition, the paint or pigment may have an ultraviolet inhibitor added thereto so as to lengthen the life of the color. It is possible to provide a 15-year life to the exterior as compared to the current five-year period for a normal paint coating.

An additional advantage of using the described laminated structure which includes the foam layer 42 is that the foam itself provides a seal at the body bolsters and sills, thus making the entire structure airtight to provide better insulation and a more weatherproof structure.

It is conventional practice in the manufacture of a fiberglass product to mold the fiberglass and auxiliary layers about a particular shape and then to apply the molded laminated product to its ultimate structure. The construction herein works the process in reverse in that the laminate is formed about the structure it is intended to cover. Thus, it is not necessary to have various size molds to accomodate different sizes and configurations of tanks.

In addition to the above-described advantages, the conventional steel outer jacket of the tank has been eliminated with a savings of approximately 6,000 lb. of weight. The insulation is more efficient, for example as much as 30 percent more efficient. This provides a substantial saving in energy in applying the heat necessary to unload the tank.

Whereas the preferred form of the invention has been shown and described herein, it should be realized that there may be many modifications, substitutions and alterations thereto.

The embodiments of the invention in which an exclusive property or privilege is claimed are defined as follows:

1. A method of forming a one-piece lightweight insulated jacket for a railroad tank car of the type comprising a metal tank supported by a plurality of body bolsters, which insulated jacket will permit expansion and contraction of the tank body due to heated contents therein, and using the metal exterior of the tank as a mold including the steps of:
   (a) applying a layer of insulation upon the tank entire exterior with the insulation adhering to said exterior, (b) spraying a one-piece layer of foam, coextensive with said layer of insulation and thicker than the insulation, in an adhering manner to the insulation exterior such that the foam provides a seal at the body bolsters to protect the insulation and the tank from weather and the foam is supported directly by the insulation, said insulation providing a heat barrier between the exterior of the tank and said foam and operating to protect the foam against expansion and contraction of the tank body, and (c) applying an exterior fiberglass coat coextensive with and upon the foam, with the fiberglass coat adhering to and forming the outer cover for the foam such that the fiberglass is supported by the foam and is isolated by the insulation from expansion and contraction of the tank.

2. The method of claim 1 wherein the fiberglass coat comprises a resin mixed with a suitable pigment to cause the exterior fiberglass coat to assume a desired color.

3. The method of claim 2 wherein the exterior fiberglass coat further comprises an ultraviolet inhibitor.

4. The method of claim 1 wherein the layer of insulation comprises a mat of glass fibers.

5. The method of claim 1 wherein the exterior fiberglass coat is applied by spraying the fiberglass coat over the layer of foam to form a unitary, one-piece outer cover for the entire tank.

6. The method of claim 1 wherein the foam is supported exclusively by the insulation rather than the tank.

7. The method of forming a one-piece insulated jacket for a railroad tank car of the type comprising a metal tank supported by a plurality of body bolsters, which insulated jacket will permit expansion and contraction of the tank body due to heated contents therein, and using the metal exterior of the tank as a mold including the steps of:

adhesively securing an insulating layer to substantially the entire exposed exterior of the tank, said insulating layer comprising a sprayed foam layer which forms a substantially weatherproof barrier around the tank and provides a seal at the body bolsters in order simultaneously to insulate the tank and to protect the tank against weather; and applying a rigid exterior fiberglass layer directly to the sprayed foam layer adhesively, without fasteners extending between the exterior layer and the tank;

said insulating layer effective to accommodate differential expansion between the tank and the exterior fiberglass layer and operating to suspend and hold the exterior fiberglass layer around the tank.

8. The method of claim 7 wherein the insulating layer further comprises a resilient layer of fibrous insulation between and in direct contact with the foam layer and the tank, said layer of fibrous insulation effective to protect the foam layer from excessive tank temperature and to support the foam layer in place around the tank, thereby protecting the foam layer from expansion of the tank.

9. The method of claim 7 wherein the applying step comprises forming the exterior fiberglass layer in place over the sprayed foam layer such that the exterior fiberglass layer is a unitary structure, coextensive with the foam layer, which operates to cover and protect the foam layer.

10. The method of claim 9 wherein the exterior fiberglass layer is coextensive with the foam layer.

11. The method of claim 7 wherein the exterior fiberglass layer comprises a resin mixed with a suitable pigment to cause the exterior fiberglass layer to assume a desired color.

12. The method of claim 11 wherein the exterior fiberglass layer further comprises an ultraviolet inhibitor.

13. The method of claim 7 wherein the insulating layer comprises a mat of glass fibers.

14. The method of claim 8 wherein the foam layer is supported exclusively by the layer of fibrous insulation rather than the tank.

* * * * *